United States Patent
Zhang et al.

(10) Patent No.: US 12,400,372 B2
(45) Date of Patent: Aug. 26, 2025

(54) PREDICTIVE CODING OF BOUNDARY UV2XYZ INDEX FOR MESH COMPRESSION

(71) Applicant: TENCENT AMERICA LLC, Palo Alto, CA (US)

(72) Inventors: Xiang Zhang, Sunnyvale, CA (US); Chao Huang, Palo Alto, CA (US); Jun Tian, Palo Alto, CA (US); Xiaozhong Xu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 349 days.

(21) Appl. No.: 18/185,076

(22) Filed: Mar. 16, 2023

(65) Prior Publication Data

US 2023/0306649 A1   Sep. 28, 2023

Related U.S. Application Data

(60) Provisional application No. 63/323,874, filed on Mar. 25, 2022.

(51) Int. Cl.
    *G06T 9/00*   (2006.01)
(52) U.S. Cl.
    CPC .................................. *G06T 9/001* (2013.01)
(58) Field of Classification Search
    None
    See application file for complete search history.

(56) References Cited

U.S. PATENT DOCUMENTS

| | | | |
|---|---|---|---|
| 10,818,069 B2 | 10/2020 | Cernigliaro et al. | |
| 10,977,773 B2* | 4/2021 | Hemmer | G06T 9/001 |
| 11,568,575 B2* | 1/2023 | Hemmer | G06T 3/40 |
| 11,666,825 B2* | 6/2023 | Delamont | G06T 19/006 |
| | | | 463/32 |
| 12,154,300 B2* | 11/2024 | Zhang | H04N 19/105 |
| 2017/0091997 A1* | 3/2017 | Tuffreau | G06T 7/60 |
| 2020/0265552 A1* | 8/2020 | Hemmer | G06T 17/205 |

(Continued)

OTHER PUBLICATIONS

Xiangnan Yin, et al. "Weakly-Supervised Photo-realistic Texture Generation for 3D Face Reconstruction" Jun. 14, 2021, arXiv:2106.08148v1 [cs.CV] (10 pages).

(Continued)

*Primary Examiner* — Anand P Bhatnagar
(74) *Attorney, Agent, or Firm* — Sughrue Mion, PLLC

(57) ABSTRACT

A method and apparatus that receives a coded video bitstream from an encoder; retrieves, from the coded video bitstream, a mesh including a plurality of polygons that describe one or more surfaces of a volumetric object; predicts a current value of an index of the UV-to-XYZ index array from at least one previously coded value included in another index in the UV-to-XYZ index array, wherein the UV-to-XYZ index array includes a plurality of indices which correspond each two-dimensional (2D) UV vertex associated with the mesh to a three-dimensional (3D) XYZ vertex associated with the mesh; derives a prediction residual associated with the current value of the index of the UV-to-XYZ index array; and reconstructs a boundary UV coordinate based on the predicted current value of the index of the UV-to-XYZ index array and the derived prediction residual.

20 Claims, 9 Drawing Sheets

(56) References Cited

U.S. PATENT DOCUMENTS

| | | | |
|---|---|---|---|
| 2020/0265611 A1* | 8/2020 | Hemmer | G06T 9/001 |
| 2021/0150765 A1 | 5/2021 | Mammou et al. | |
| 2021/0217203 A1* | 7/2021 | Kim | G06T 9/001 |
| 2023/0074762 A1* | 3/2023 | Huang | G06T 9/001 |
| 2023/0386091 A1* | 11/2023 | Hemmer | G06T 9/00 |

OTHER PUBLICATIONS

Written Opinion of the international Searching Authority dated Aug. 2, 2023 in Application No. PCT/US23/15444.

International Search Report dated Aug. 2, 2023 in Application No. PCT/US23/15444.

Extended European Search Report issued Jun. 4, 2025 in EP Application No. 23764555.1.

Supplementary European Search Report issued Jun. 25, 2025 in EP Application No. 23764555.1.

Zhao, et al., "Mesh Segmentation for Parallel Decompression on GPU", Nov. 8, 2012, SAT 2015 18th International Conference, Austin, TX, USA, Sep. 24-27, 2015; pp. 83-90 Cited in EESR dated Jun. 4, 2025.

Wood Zoe J et al., "Multi-Chart Geometry Images", Eurographics Symposium on Geometry Processing, 2003, Sep. 8, 2009, pp. 1-10 Cited in EESR dated Jun. 4, 2025.

Huang, et al., "Boundary-Preserved Geometry Video for Dynamic Mesh Coding", 2022 Picture Coding Symposium (PCS), IEEE, Dec. 7, 2022, pp. 133-137 Cited in EESR dated Jun. 4, 2025.

Xiang Zhang (Tencent) et al., "[V-CG] Tencent's Dynamic Mesh Coding CfP Response", 138. MPEG Meeting; Apr. 25, 2022- Apr. 29, 2022; Online; (Motion Picture Expert Group or ISO/IEC JTC1/SC29/WG11) Cited in EESR issued Jun. 4, 2025.

* cited by examiner

PREDICTIVE CODING OF BOUNDARY UV2XYZ INDEX FOR MESH COMPRESSION

CROSS-REFERENCE TO RELATED APPLICATION

This application claims priority from U.S. Provisional Application No. 63/323,874, filed on Mar. 25, 2022, the disclosure of which is incorporated herein by reference in its entirety.

TECHNICAL FIELD

This disclosure is directed to a set of advanced video coding technologies. More specifically, the present disclosure is directed to coding methods of UV-to-XYZ (UV2XYZ) index of boundary vertices for efficient mesh compression.

BACKGROUND

The advances in 3D capture, modeling, and rendering have promoted the ubiquitous presence of 3D contents across several platforms and devices. Nowadays, it is possible to capture a baby's first step in one continent and allow the grandparents to see (and may be interact) and enjoy a full immersive experience with the child in another continent. Nevertheless, in order to achieve such realism, models are becoming ever more sophisticated, and a significant amount of data is linked to the creation and consumption of those models. 3D meshes are widely used to represent such immersive contents.

A dynamic mesh sequence may require a large amount of data since it may consist of a significant amount of information changing over time. Therefore, efficient compression technologies are required to store and transmit such contents. Mesh compression standards IC, MESHGRID, FAMC were previously developed by MPEG to address dynamic meshes with constant connectivity and time varying geometry and vertex attributes. However, these standards do not take into account time varying attribute maps and connectivity information. DCC (Digital Content Creation) tools usually generate such dynamic meshes. In counterpart, it is challenging for volumetric acquisition techniques to generate a constant connectivity dynamic mesh, especially under real time constraints. This type of contents is not supported by the existing standards. MPEG is planning to develop a new mesh compression standard to directly handle dynamic meshes with time varying connectivity information and optionally time varying attribute maps. This standard targets lossy, and lossless compression for various applications, such as real-time communications, storage, free viewpoint video, AR and VR. Functionalities such as random access and scalable/progressive coding are also considered.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

The present disclosure provides a method of UV2XYZ index of boundary vertices for efficient mesh compression.

According to some embodiments, there is provided a method performed by at least one processor. The method includes receiving a coded video bitstream from an encoder. The method further includes retrieving, from the coded video bitstream, a mesh including a plurality of polygons that describe one or more surfaces of a volumetric object. The method further includes predicting a current value of an index of the UV-to-XYZ index array from at least one previously coded value included in another index in the UV-to-XYZ index array, wherein the UV-to-XYZ index array includes a plurality of indices which correspond each two-dimensional (2D) UV vertex associated with the mesh to a three-dimensional (3D) XYZ vertex associated with the mesh. The method further includes deriving a prediction residual associated with the current value of the index of the UV-to-XYZ index array. The method further includes reconstructing a boundary UV coordinate based on the predicted current value of the index of the UV-to-XYZ index array and the derived prediction residual.

According to some embodiments, an apparatus includes at least one memory configured to store program code and at least one processor configured to read the program code and operate as instructed by the program code. The program code includes receiving code configured to cause the at least one processor to receive a coded video bitstream from an encoder. The program code further includes retrieving code configured to cause the at least one processor to retrieve, from the coded video bitstream, a mesh including a plurality of polygons that describe one or more surfaces of a volumetric object. The program code further includes predicting code configured to cause the at least one processor to predict a current value of an index of the UV-to-XYZ index array from at least one previously coded value included in another index in the UV-to-XYZ index array, wherein the UV-to-XYZ index array includes a plurality of indices which correspond each two-dimensional (2D) UV vertex associated with the mesh to a three-dimensional (3D) XYZ vertex associated with the mesh. The program code further includes deriving code configured to cause the at least one processor to derive a prediction residual associated with the current value of the index of the UV-to-XYZ index array. The program code further includes reconstructing code configured to cause the at least one processor to reconstruct a boundary UV coordinate based on the predicted current value of the index of the UV-to-XYZ index array and the derived prediction residual.

According to some embodiments, a non-transitory computer-readable storage medium, stores instructions that, when executed by at least one processor, cause the at least one processor to receive a coded video bitstream from an encoder. The instructions further cause the at least one processor to retrieve, from the coded video bitstream, a mesh including a plurality of polygons that describe one or more surfaces of a volumetric object. The instructions further cause the at least one processor to predict a current value of an index of the UV-to-XYZ index array from at least one previously coded value included in another index in the UV-to-XYZ index array, wherein the UV-to-XYZ index array includes a plurality of indices which correspond each two-dimensional (2D) UV vertex associated with the mesh to a three-dimensional (3D) XYZ vertex associated with the mesh. The instructions further cause the at least one processor to derive a prediction residual associated with the current value of the index of the UV-to-XYZ index array. The instructions further cause the at least one processor to reconstruct a boundary UV coordinate based on the predicted current value of the index of the UV-to-XYZ index array and the derived prediction residual.

Additional embodiments will be set forth in the description that follows and, in part, will be apparent from the description, and/or may be learned by practice of the presented embodiments of the disclosure.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

The following detailed description of example embodiments refers to the accompanying drawings. The same reference numbers in different drawings may identify the same or similar elements.

A mesh may include several polygons that describe the surface of a volumetric object. Its vertices in 3D space and the information of how the vertices are connected may define each polygon, referred to as connectivity information. Optionally, vertex attributes, such as colors, normals, etc., may be associated with the mesh vertices. Attributes may also be associated with the surface of the mesh by exploiting mapping information that parameterizes the mesh with 2D attribute maps. Such mapping may be defined using a set of parametric coordinates, referred to as UV coordinates or texture coordinates, and associated with the mesh vertices. 2D attribute maps may be used to store high resolution attribute information such as texture, normals, displacements etc. The high resolution attribute information may be used for various purposes such as texture mapping and shading.

As stated above, a 3D mesh or dynamic meshes may require a large amount of data since it may consist of a significant amount of information changing over time. In particular, the boundary information is a significant part of the entire mesh. Therefore, efficient compression technologies are needed to efficient compress the boundary information.

In this disclosure, a number of methods are proposed for coding of boundary's UV2XYZ (UV-to-XYZ) index array in mesh compression. They may be applied individually or by any form of combinations. The methods may be applied to static meshes, where there is only one frame of the mesh, or the mesh content does not change over time.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

Suppose the total number of boundary vertices is N, and the number of boundary vertices that have unique xyz coordinates is M (M≤N). UV2XYZ is a 1D array with the length of N, where each element in the array indicates the index to a unique xyz coordinates, i.e., UV2XYZ[i]∈{0, 1, ..., M−1}, for i=0, 1, ..., N−1.

The UV2XYZ may be separated into segments where each segment contains the UV2XYZ indices of a chart.

There are multiple ways to code the array of UV2XYZ in a lossless way.

Figure 1:
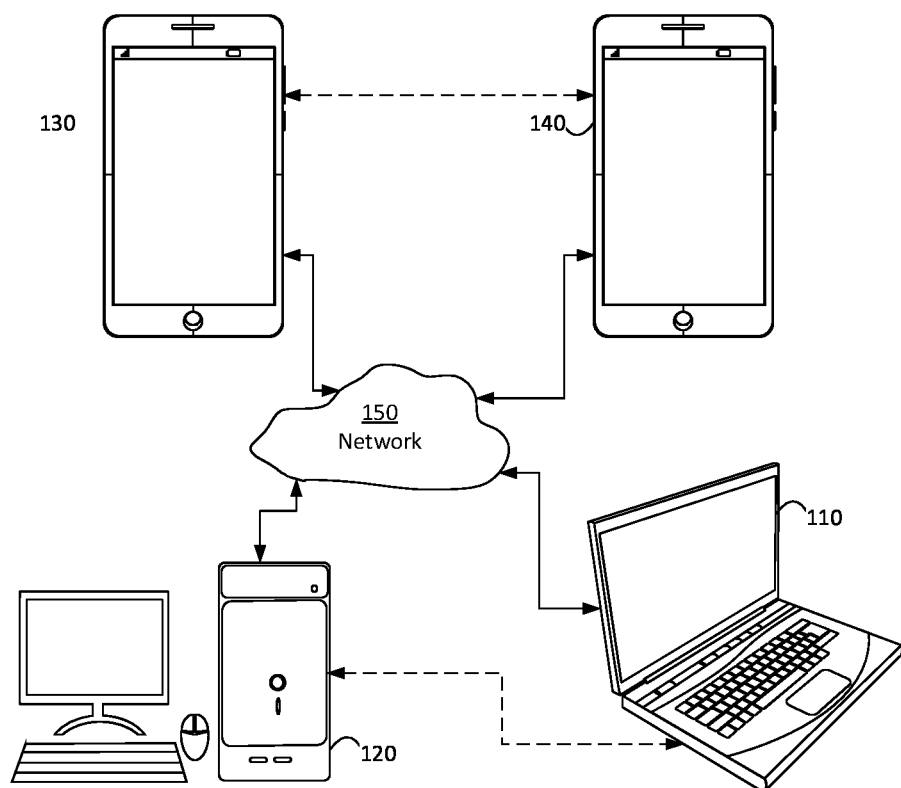
FIG. 1 is a schematic illustration of a simplified block diagram of a communication system, according to some embodiments.
Figure 2:
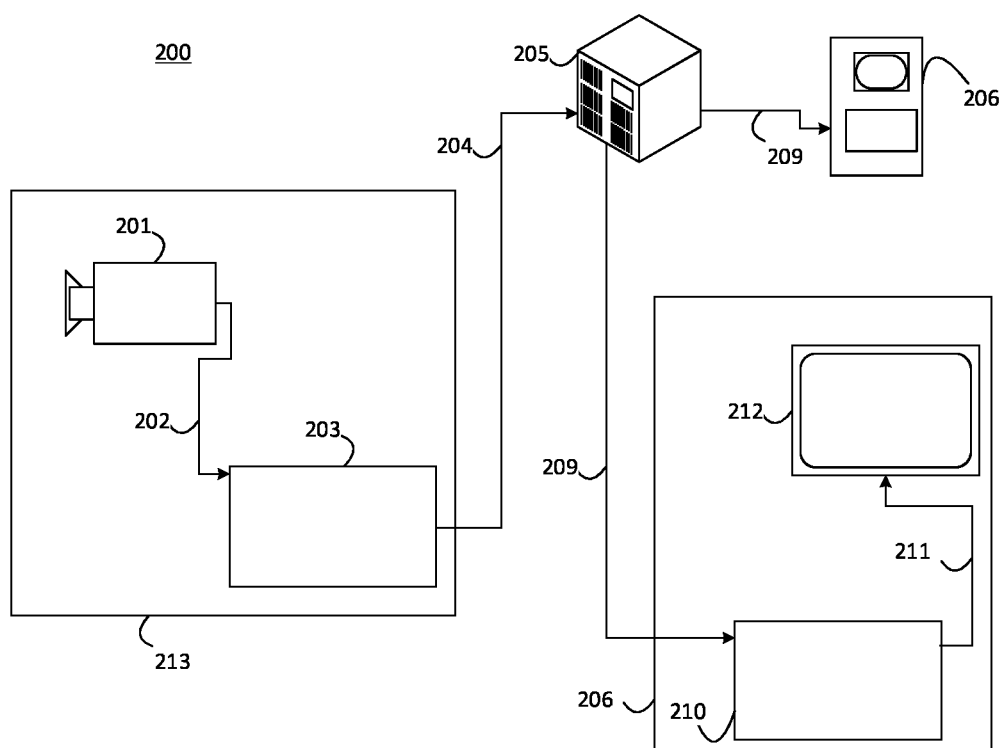
FIG. 2 is a schematic illustration of a simplified block diagram of a streaming system, according to some embodiments.

With reference to FIGS. 1-2, an embodiment of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, may be stored on a streaming server 205 for future use. One or more streaming clients 206 may access the streaming server 205 to retrieve video bit streams 209 that may be copies of the encoded video bitstream 204.

The streaming clients 206 may include a video decoder 210 and a display 212. The video decoder 210 can, for example, decode video bitstream 209, which is an incoming copy of the encoded video bitstream 204, and create an outgoing video sample stream 211 that may be rendered on the display 212 or another rendering device (not depicted). In some streaming systems, the video bitstreams 204, 209 may be encoded according to certain video coding/compression standards.

Figure 3:
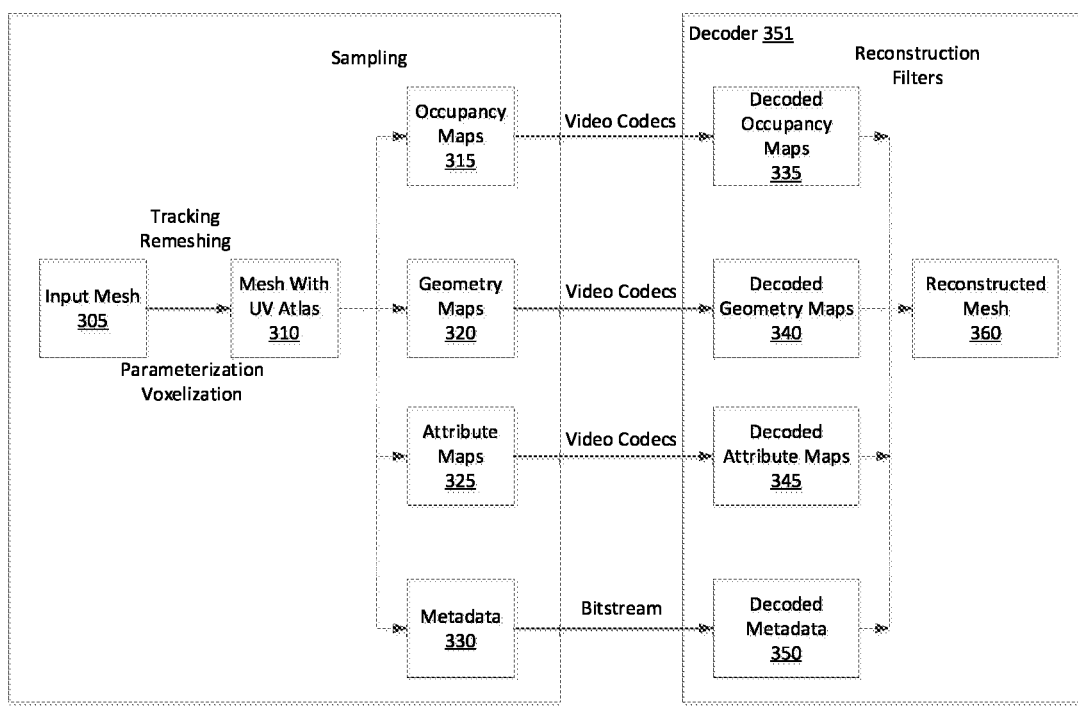
FIG. 3 is a schematic illustration of a simplified block diagram of a video encoder and decoder, according to some embodiments.

FIG. 3 is an exemplary diagram of framework 300 for dynamic mesh compression and mesh reconstruction using encoders and decoders. Each frame of the input meshes may be preprocessed by a series of operations, e.g., tracking, remeshing, parameterization, voxelization. These operations may be encoder-only, meaning they might not be part of the decoding process. After that, one may get the meshes with 2D UV atlases, where each vertex of the mesh has one or more associated UV coordinates on the 2D atlas. Then, the meshes may be converted to multiple maps, including the occupancy maps, geometry maps and attribute maps, by sampling on the 2D atlas. Then these 2D maps may be coded by any video/image codecs, such as HEVC, VVC, AV1, AVS3, etc. On the decoder side, the meshes may be reconstructed from the decoded 2D maps. Any post-processing and filtering may also be applied on the reconstructed meshes. Other metadata might be signaled to the decoder side for the purpose of 3D mesh reconstruction. The occupancy map may be inferred from the decoder side if the boundary vertices of each chart are signaled.

As seen in FIG. 3, framework 300 may include an encoder 301 and a decoder 351. The encoder 301 may include one or more input mesh 305, one or more mesh with UV atlas 310, occupancy maps 315, geometry maps 320, attribute maps 325, and metadata 330. The decoder 351 may include decoded occupancy maps 335, decoded geometry maps 340, decoded attribute maps 345, decoded metadata 350, and reconstructed mesh 360.

According to an aspect of the present disclosure, the input mesh 305 may include one or more frames, and each of the one or more frames may be preprocessed by a series of operations and used to generate the mesh with UV atlas 310. As an example, the preprocessing operations may include and may not be limited to tracking, parameterization, remeshing, voxelization, etc. In some embodiments, the preprocessing operations may be performed only on the encoder side and not the decoder side.

The mesh with UV atlas 310 may be a 2D mesh. The 2D mesh with UV atlas may be a mesh in which each vertex of the mesh may be associated with UV coordinates on a 2D atlas. The mesh with the UV atlas 310 may be processed and converted into a plurality of maps based on sampling. As an example, the UV atlas 310 may be processed and converted into occupancy maps, geometry maps, and attribute maps based on sampling the 2D mesh with UV atlas. The generated occupancy maps 335, geometry maps 340, and attribute maps 345 may be encoded using appropriate codecs (e.g., HVEC, VVC, AV1, etc.) and transmitted to a decoder. In some embodiments, metadata (e.g., connectivity information etc.) may also be transmitted to the decoder.

According to an aspect, the decoder 351 may receive the encoded occupancy maps, geometry maps, and attribute maps from an encoder. The decoder 351 may use appropriate techniques and methods, in addition to embodiments described herein, to decode the occupancy maps, geometry maps, and attribute maps. In an embodiment, decoder 351 may generate decoded occupancy maps 335, decoded geometry maps 340, decoded attribute maps 345, and decoded metadata 350. The input mesh 305 may be reconstructed into reconstructed mesh 360 based on the decoded occupancy maps 335, decoded geometry maps 340, decoded attribute maps 345, and decoded metadata 350 using one or more reconstruction filters and techniques. In some embodiments, the metadata 330 may be directly transmitted to decoder 351 and the decoder 351 may use the metadata to generate the reconstructed mesh 360 based on the decoded occupancy maps 335, decoded geometry maps 340, and decoded attribute maps 345. Post-filtering techniques, including but not limited to remeshing, parameterization, tracking, voxelization, etc., may also be applied on the reconstructed mesh 360.

Figure 4:
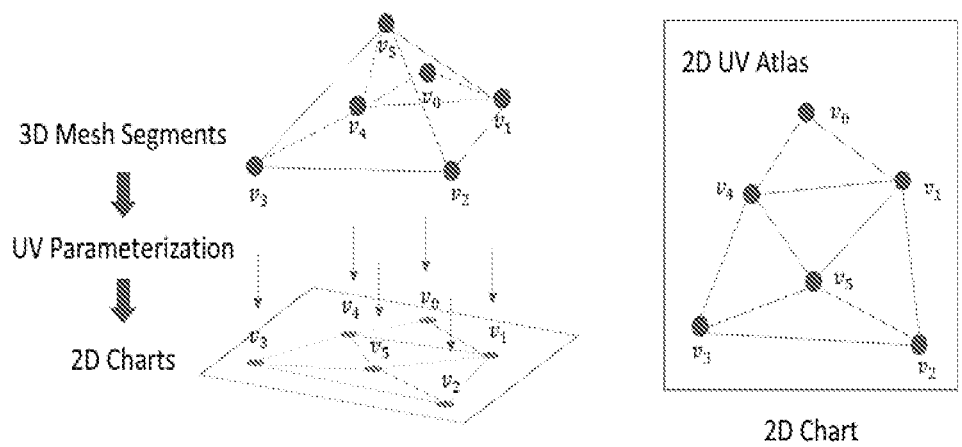
FIG. 4 is an illustration of the process of UV parameterization mapping from 3D mesh segments onto 2D charts, according to some embodiments.

In some embodiments, a 3D mesh may be partitioned into several segments (or patches/charts). Each segment may include a set of connected vertices associated with their geometry, attribute, and connectivity information. As illustrated in FIG. 4, the UV parameterization process maps a mesh segment onto a 2D chart in the 2D UV atlas. Each vertex in the mesh segment will be assigned with a 2D UV coordinates in the 2D UV atlas. The vertices in a 2D chart form a connected component as their 3D counterpart. The geometry, attribute, and connectivity information of each vertex may be inherited from their 3D counterpart as well.

Figure 5:
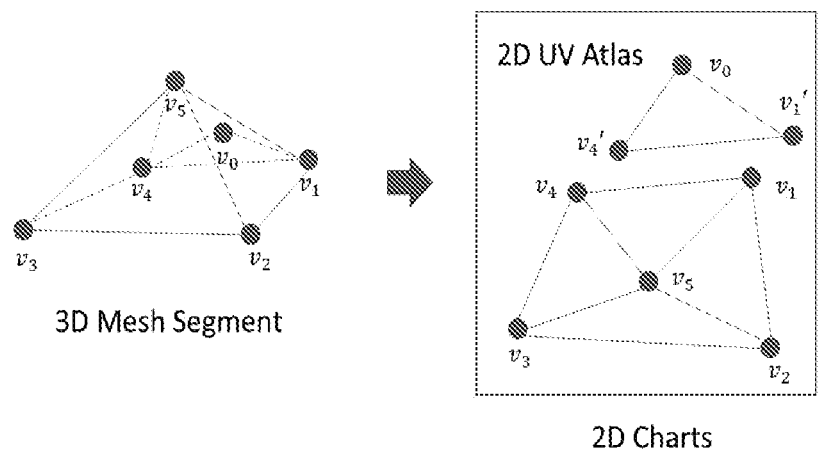
FIG. 5 is an illustration of a different UV parameterization where the 3D mesh segment is mapped to multiple separate charts, according to some embodiments.

A 3D mesh segment may be also mapped to multiple separate 2D charts. In this case, a vertex in 3D could corresponds to multiple vertices in 2D UV atlas. As shown in FIG. 5, the same 3D mesh segment is mapped to 2 2D charts, instead of a single chart, in the 2D UV atlas. 3D vertices v1 and v4 have two 2D correspondences respectively.

Figure 6:
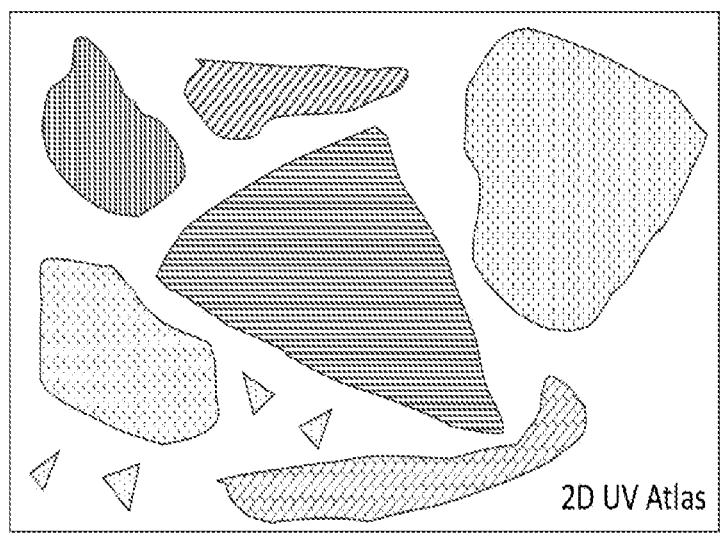
FIG. 6 is a general 2D UV atlas with multiple charts, according to some embodiments.

A general 2D UV atlas of a 3D mesh may consist of multiple charts as shown in FIG. 6, where each chart may contain multiple (usually more than or equal to 3) vertices associated with their 3D geometry, attribute, and connectivity information.

Figure 7:
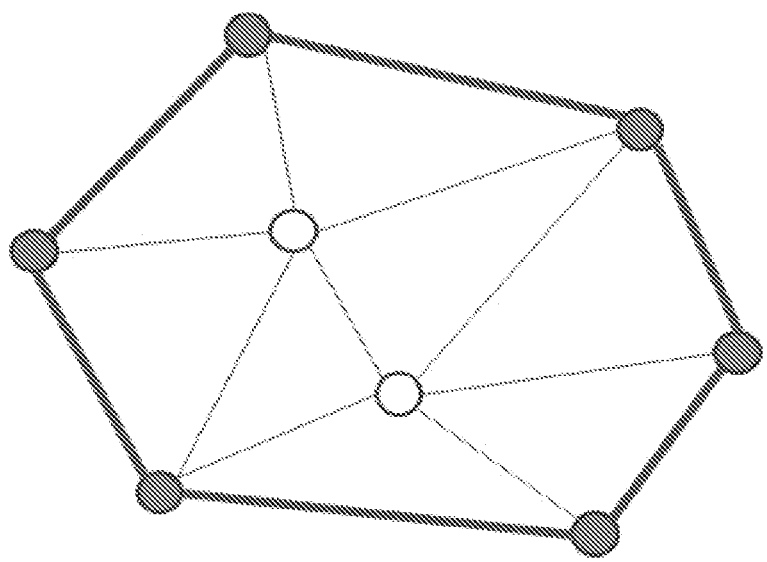
FIG. 7 is an illustration of boundary vertices in a 2D chart, according to some embodiments.

Boundary vertices are defined in the 2D UV space. As shown in FIG. 7, the filled vertices are boundary vertices because they are on the boundary edges of a connected component (a patch/chart). A boundary edge may be determined by checking if the edge is only appeared in one triangle. The following information of boundary vertices is significant and should be signaled in the bitstream.

Geometry information, i.e., the 3D xyz coordinates.
2D UV coordinates.

For the case of that a boundary vertex in 3D corresponds to multiple vertices in 2D UV atlas as shown in FIG. 5, the mapping from 3D XYZ to 2D UV may be one-to-multiple. Therefore, a UV-to-XYZ (or referred to as UV2XYZ) index may be signaled to indicate the mapping function. UV2XYZ is a 1D-array of indices that correspond each 2D uv vertex to a 3D xyz vertex.

In some embodiments, the UV-to-XYZ index may be an index of a UV-to-XYZ index array, which may include a plurality of elements indicating a mapping function for one or more 2D UV coordinates to one or more 3D XYZ coordinates. For example, the elements in the array may indicate an index to one or more unique XYZ coordinates which correspond to particular UV coordinates.

In some embodiments, the predictive coding is applied. The current value of UV2XYZ is predicted from the previous coded values in UV2XYZ array. Denote the predicted value of current UV2XYZ[i] as $UV2XYZ_p[i]$.

In one embodiment, the current value of UV2XYZ[i] is predicted from the previous coded value in UV2XYZ, i.e., $UV2XYZ_p[i]=UV2XYZ[i-1]$.

In another embodiment, the current value of UV2XYZ[i] has no prediction, then the predictor may be set as a constant value. For example, the first value of UV2XYZ in a chart may have no appropriate predictor, then $UV2XYZ_p[0]$ may be set to 0.

In another embodiment, the current value of UV2XYZ [i] may have multiple predictors. In this case, a predictor candidate list may be established with an index signaled to indicate which predictor is used. In one example, the last two coded UV2XYZ values may be used to form such a candidate list. A 1-bit index is signaled to indicate which of the two predictors is used for predicting the current value of UV2XYZ[i].

In another embodiment, the current value of UV2XYZ[i] may have multiple predictors. In this case, some weighted average of these predictors may be used for the prediction. For example, the average of all the predictors is used.

The prediction residual between the original UV2XYZ and the predictor, i.e., $UV2XYZ_d[i]=UV2XYZ[i]-UV2XYZ_p[i]$, may then be coded by entropy codec in a lossless way.

In one embodiment, the prediction residual is coded by fixed-length coding. The bit length may either be coded in high-level syntax table for all charts, or be coded differently for each chart.

In another embodiment, the prediction residual is coded by unary coding.

In another embodiment, the prediction residual is coded by Exponential-Golomb coding.

In another embodiment, the prediction residual may be coded by the syntax elements as shown in syntax Table 1 below.

TABLE 1

|  | Descriptor |
|---|---|
| uv2xyz_prediction_residual ( ) { |  |
|   prediction_residual_abs_eq1 | ae(v) |
|   prediction_residual_sign | ae(v) |
|   if ( !prediction_residual_abs_eq1 ) { |  |
|     prediction_residual_abs_minus2 | ue(v) |
|   } |  |
| } |  |

In one or more examples, the variable prediction_residual_sign may specify the sign bit of the prediction residual. In one or more examples, the variable prediction_residual_abs_eq1 may specify if the absolute value of the prediction residual equals to 1 or not. In one or more examples, the variable prediction_residual_abs_minus2 may specify the absolute value of the prediction residual minus 2.

According to one or more embodiments, on the decoder side, the prediction residual of UV2XYZ may be derived from the above syntax elements, as follows:

```
if ( prediction_residual_abs_eq1 ) {
    UV2XYZ_d[i] = prediction_residual_sign ? 1 : -1;
} else {
    UV2XYZ_d[i] = prediction_residual_sign ?
  prediction_residual_abs_minus2 + 2 : -
  prediction_residual_abs_minus2 - 2;
}
```

Then, the original UV2XYZ value may be recovered by $UV2XYZ[i]=UV2XYZ_d[i]+UV2XYZ_p[i]$.

In another embodiment, the prediction residual may be coded by the syntax elements as shown in syntax Table 2 below.

TABLE 2

|  | Descriptor |
|---|---|
| uv2xyz_prediction_residual ( ) { |  |
|   prediction_residual_eq1 | ae(v) |
|   if ( !prediction_residual_eq1 ) { |  |
|     prediction_residual_eq_minus1 | ae(v) |
|     if ( !prediction_residual_eq_minus1 ) { |  |
|       prediction_residual_sign | ae(v) |
|       prediction_residual_abs_minus2 | ue(v) |
|     } |  |
|   } |  |
| } |  |

In one or more examples, the variable prediction_residual_eq1 may specify if the prediction residual equals to 1 or not. In one or more examples, the variable prediction_residual_eq_minus1 may specify if the prediction residual equals to -1 or not. In one or more examples, the variable prediction_residual_sign may specify the sign bit of the prediction residual. In one or more examples, the variable prediction_residual_abs_minus2 may specify the absolute value of the prediction residual minus 2.

According to one or more embodiments, on the decoder side, the prediction residual of UV2XYZ may be derived from the above syntax elements, as follows:

```
if ( prediction_residual_eq1 ) {
    UV2XYZ_d[i] = 1;
} else if ( prediction_residual_eq_minus1) {
    UV2XYZ_d[i] = -1;
} else {
```

-continued

```
UV2XYZ_d[i] = prediction_residual_sign ?
prediction_residual_abs_minus2 + 2 : -
prediction_residual_abs_minus2 - 2;
   }
```

Then, the original UV2XYZ may be recovered by UV2XYZ[i]=UV2XYZ$_d$[i]+UV2XYZ$_p$[i].

Due to the nature of vertex storage, when assigning neighboring vertices' index into the UV2XYZ array, the neighboring UV2XYZ values have commonly a index difference by 1. Often, for a certain range, it shows monotonical increase or decrease trends. Therefore, the UV2XYZ array may be represented by the following form as a general manner:

$$(a, a+1, a+2, \ldots, a+n_a)(b, b-1, b-2, \ldots, b-n_b)(c, c+1, c+2, \ldots, c+n_c),$$

in which it can be separated into several sub-sequences. Each sequence consists of continuous indices with the step of +1 or −1.

Therefore, the UV2XYZ array can be represented and coded as a tuple of run-length-direction:

$$(a, n_a, 1), (b, n_b, -1), (c, n_c, 1),$$

In one or more examples, a UV2XYZ array may be {100,101,102, 99, 98, 97, 96, 103, 104}. In the above form, this array may be equivalently written as (100, 2, 1), (99, 3, −1), (103, 1, 1).

According to one or more embodiments, the tuple of (RUN, LEN, DIR) may be defined as follows. The variable RUN may be a starting index in a run. The variable LEN may be a length of the run minus 1. The variable DIR may be a direction of the run (e.g., 1 for increasing, −1 for decreasing). In one or more examples, the tuple may be coded in different way. For example, the variable RUN may be coded by a fixed-length, where the bit length may be determined by a number of unique xyz boundary vertices (e.g., $\lceil \log_2 M \rceil$). In one or more examples, the variable LEN may be coded by a fixed-length, where the bit length may be determined by the number of uv boundary vertices in current chart (e.g., $\lceil \log_2 N_j \rceil$), where $N_j$ is the number of uv boundary vertices in the $j^{th}$ chart. In one or more examples, the variable DIR may be coded by 1-bit bypassing coding. In another embodiment, DIR may be coded by arithmetic coding with contexts.

Since UV2XYZ is a boundary loop, it happens that a run is split by the two ends of the linear array. For example, (a+2, a+3, a+4, a, a+1) should be a single tuple because the first and last elements are connected. But the algorithm may think it has two runs, i.e., (a+2, 2, 1) and (a, 1, 1).

Encoder may then reorder the indices to make sure that the UV2XYZ doesn't have a split run, for example, the above array can be reordered as (a, a+1, a+2, a+3, a+4), and then it may be represented by a single tuple (a, 4, 1). The boundary UV and boundary XYZ should be reordered correspondingly in this case.

Figure 8:
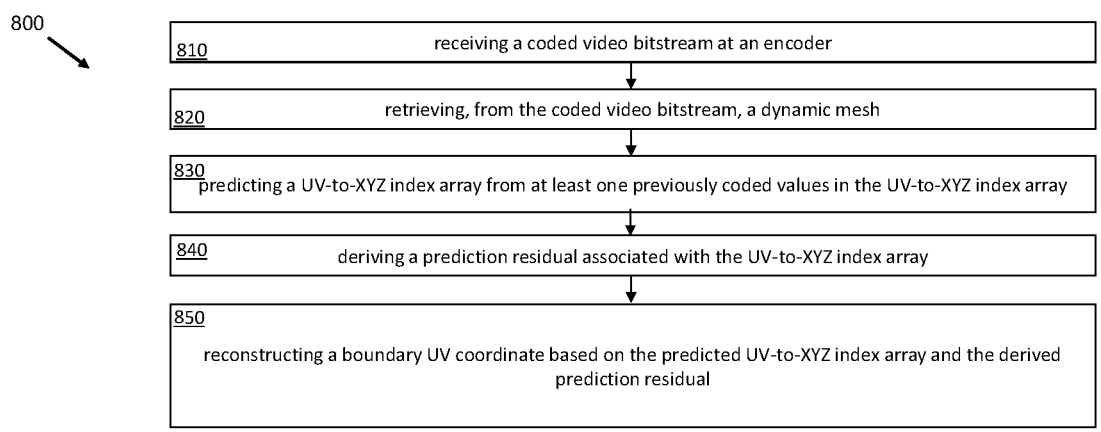
FIG. 8 is an operational flowchart illustrating the steps carried out by a program for coding a UV2XYZ index of boundary vertices for efficient mesh compression, according to some embodiments.

FIG. 8 is a flowchart of example process 800 for coding a UV2XYZ index of boundary vertices for efficient mesh compression. In some implementations, one or more process blocks of FIG. 8 may be performed by any of the elements discussed above.

As shown in FIG. 8, process 800 may include receiving a coded video bitstream at an encoder (block 810).

As further shown in FIG. 8, the process 800 may include retrieving, from the coded video bitstream, a dynamic mesh (block 820).

As further shown in FIG. 8, the process 800 may include predicting a UV-to-XYZ index array from at least one previously coded values in the UV-to-XYZ index array (block 830).

As further shown in FIG. 8, the process 800 may include deriving a prediction residual associated with the UV-to-XYZ index array (block 840).

As further shown in FIG. 8, the process 800 may include reconstructing a boundary UV coordinate based on the predicted UV-to-XYZ index array and the derived prediction residual (block 850).

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The techniques, described above, may be implemented as computer software using computer-readable instructions and physically stored in one or more computer-readable media. For example, FIG. 9 shows a computer system 900 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 9:
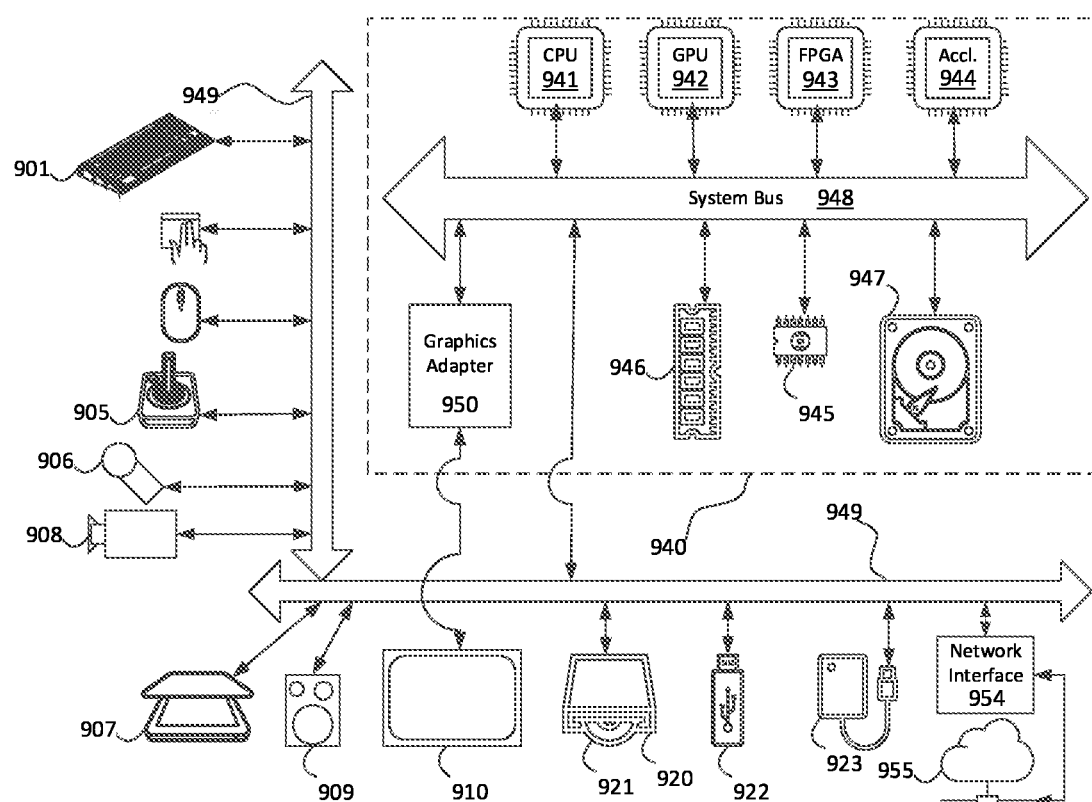
FIG. 9 is a diagram of a computer system suitable for implementing embodiments.

The components shown in FIG. 9 for computer system 900 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data glove, or joystick 905, but there may also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability— some of which may be capable to output two dimensional visual output or more than three dimensional output through means such as stereographic output; virtual-reality glasses (not depicted), holographic displays and smoke tanks (not depicted)), and printers (not depicted).

Computer system 900 may also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 may also include interface to one or more communication networks. Networks may for example be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 955. Certain protocols and protocol stacks may be used on each of those networks and network interfaces as described above.

Aforementioned human interface devices, human-accessible storage devices, and network interfaces 954 may be attached to a core 940 of the computer system 900.

The core 940 may include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 may be accessible in the form of one or more physical plugs to enable extensions by additional CPUs, GPU, and the like. The peripheral devices may be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 may execute certain instructions that, in combination, may make up the aforementioned computer code. That computer code may be stored in ROM 945 or RAM 946. Transitional data may be also be stored in RAM 946, whereas permanent data may be stored for example, in the internal mass storage 947. Fast storage and retrieve to any of the memory devices may be enabled through the use of cache memory, that may be closely associated with one or more CPU 941, GPU 942, mass storage 947, ROM 945, RAM 946, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture 900, and specifically the core 940 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 940 that are of non-transitory nature, such as core-internal mass storage 947 or ROM 945. The software implementing various embodiments of the present disclosure may be stored in such devices and executed by core 940. A computer-readable medium may include one or more memory devices or chips, according to particular needs. The software may cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system may provide functionality as a result of logic hardwired or otherwise embodied in a circuit (for example: accelerator 944), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method performed by at least one processor in a decoder, the method comprising:
receiving a coded video bitstream from an encoder;
retrieving, from the coded video bitstream, a mesh comprising a plurality of polygons that describe one or more surfaces of a volumetric object;

predicting a current value of an index of a UV-to-XYZ index array from at least one previously coded value included in another index in the UV-to-XYZ index array, wherein the UV-to-XYZ index array comprises a plurality of indices which correspond each two-dimensional (2D) UV vertex associated with the mesh to a three-dimensional (3D) XYZ vertex associated with the mesh;

deriving a prediction residual associated with the current value of the index of the UV-to-XYZ index array; and reconstructing a boundary UV coordinate based on the predicted current value of the index of the UV-to-XYZ index array and the derived prediction residual.

2. The method of claim 1, wherein the prediction residual is coded by a fixed length coding.

3. The method of claim 1, wherein the prediction residual is coded by Exponential-Golomb coding.

4. The method of claim 1, wherein the prediction residual is coded by unary coding.

5. The method of claim 1, wherein the prediction residual is coded by one or more syntax elements included in the coded video bitstream that specify a magnitude and sign of the prediction residual.

6. The method of claim 1, wherein the UV-to-XYZ index array is coded as a tuple of run-length-direction.

7. The method of claim 1, wherein the UV-to-XYZ index array is a boundary loop.

8. An apparatus comprising:
at least one memory configured to store program code; and
at least one processor configured to read the program code and operate as instructed by the program code, the program code comprising:
receiving code configured to cause the at least one processor to receive a coded video bitstream from an encoder;
retrieving code configured to cause the at least one processor to retrieve, from the coded video bitstream, a mesh comprising a plurality of polygons that describe one or more surfaces of a volumetric object;
predicting code configured to cause the at least one processor to predict a current value of an index of a UV-to-XYZ index array from at least one previously coded value included in another index in the UV-to-XYZ index array, wherein the UV-to-XYZ index array comprises a plurality of indices which correspond each two-dimensional (2D) UV vertex associated with the mesh to a three-dimensional (3D) XYZ vertex associated with the mesh;
deriving code configured to cause the at least one processor to derive a prediction residual associated with the current value of the index of the UV-to-XYZ index array; and
reconstructing code configured to cause the at least one processor to reconstruct a boundary UV coordinate based on the predicted current value of the index of the UV-to-XYZ index array and the derived prediction residual.

9. The apparatus according to claim 8, wherein the prediction residual is coded by a fixed length coding.

10. The apparatus according to claim 8, wherein the prediction residual is coded by Exponential-Golomb coding.

11. The apparatus according to claim 8, wherein the prediction residual is coded by unary coding.

12. The apparatus according to claim 8, wherein the prediction residual is coded by one or more syntax elements included in the coded video bitstream that specify a magnitude and sign of the prediction residual.

13. The apparatus according to claim 8, wherein the UV-to-XYZ index array is coded as a tuple of run-length-direction.

14. The apparatus according to claim 8, wherein the UV-to-XYZ index array is a boundary loop.

15. A non-transitory computer-readable storage medium, storing instructions, which, when executed by at least one processor, cause the at least one processor to:
receive a coded video bitstream from an encoder;
retrieve, from the coded video bitstream, a mesh comprising a plurality of polygons that describe one or more surfaces of a volumetric object;
predict a current value of an index of a UV-to-XYZ index array from at least one previously coded value included in another index in the UV-to-XYZ index array, wherein the UV-to-XYZ index array comprises a plurality of indices which correspond each two-dimensional (2D) UV vertex associated with the mesh to a three-dimensional (3D) XYZ vertex associated with the mesh;
derive a prediction residual associated with the current value of the index of the UV-to-XYZ index array; and
reconstruct a boundary UV coordinate based on the predicted current value of the index of the UV-to-XYZ index array and the derived prediction residual.

16. The non-transitory computer-readable storage medium according to claim 15, wherein the prediction residual is coded by a fixed length coding.

17. The non-transitory computer-readable storage medium according to claim 15, wherein the prediction residual is coded by Exponential-Golomb coding.

18. The non-transitory computer-readable storage medium according to claim 15, wherein the prediction residual is coded by unary coding.

19. The non-transitory computer-readable storage medium according to claim 15, wherein the prediction residual is coded by one or more syntax elements included in the coded video bitstream that specify a magnitude and sign of the prediction residual.

20. The non-transitory computer-readable storage medium according to claim 15, wherein the UV-to-XYZ index array is coded as a tuple of run-length-direction.

* * * * *